UNITED STATES PATENT OFFICE.

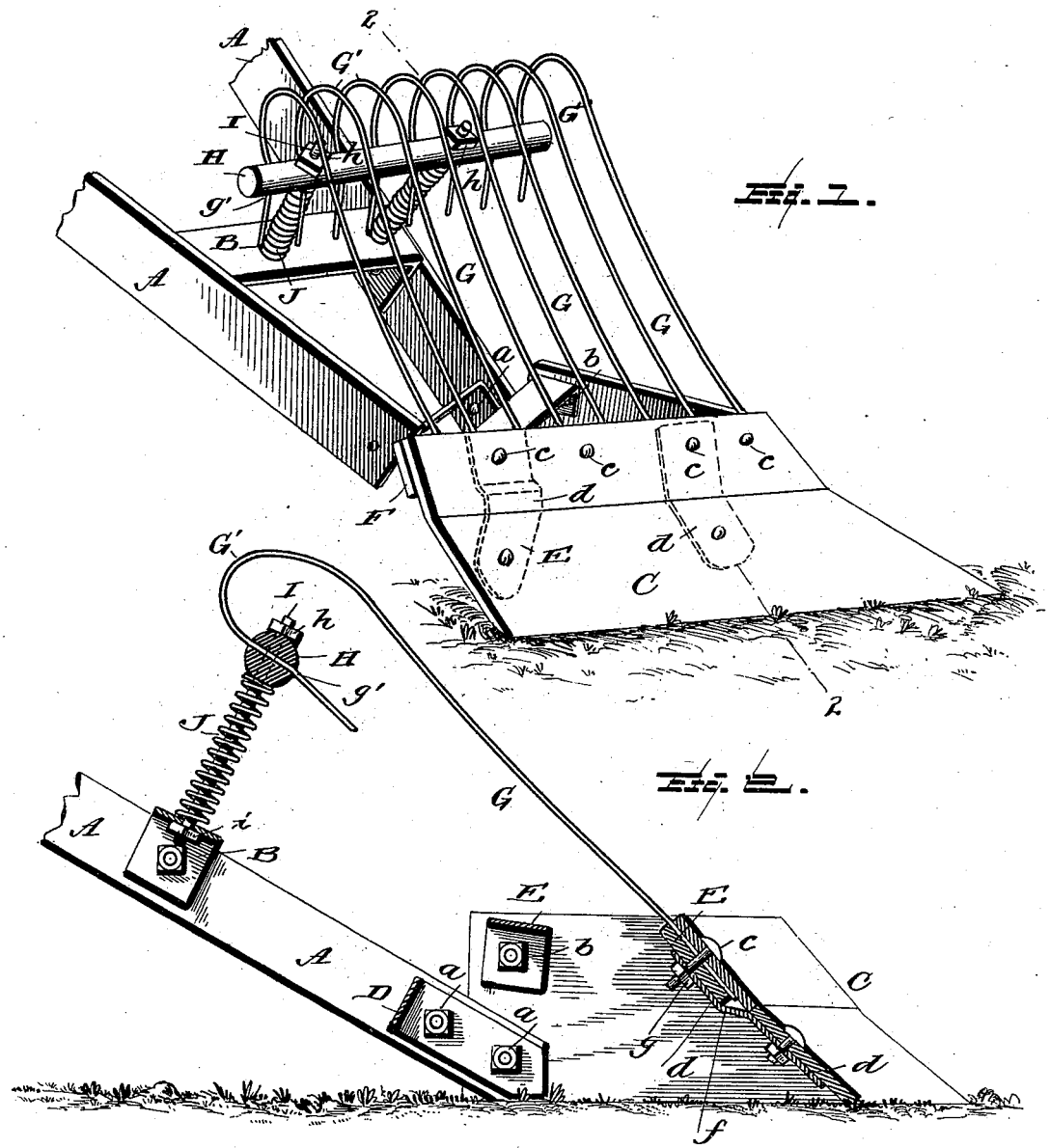

ALEXANDER R. FANCHER, OF HILLSBOROUGH, TEXAS.

PLOW.

SPECIFICATION forming part of Letters Patent No. 510,125, dated December 5, 1893.

Application filed June 7, 1893. Serial No. 476,807. (No model.)

*To all whom it may concern:*

Be it known that I, ALEXANDER R. FANCHER, a citizen of the United States, residing at Hillsborough, in the county of Hill, State of Texas, have invented certain new and useful Improvements in Plows, of which the following is a specification, reference being had therein to the accompanying drawings.

This invention relates to certain new and useful improvements in plows, and it has for its objects among others to provide an improved plow having a mold-board of independently-yielding bars and the upper end thereof mounted upon yielding supports so that better results are attained and the earth broken up as it is thrown up by the point and turned aside and completely over as soon as it comes in contact with the said wires or spring rods. By the construction shown the pitch of the mold board may be readily changed.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a perspective view showing my improvements. Fig. 2 is a vertical longitudinal section on the line 2—2 of Fig. 1.

Like letters of reference indicate like parts in both of the views.

Referring now to the details of the drawings by letter, A designates inclined bars to which the handles are designed to be attached, or they may be extended to form the handles, if desired, and near their lower ends they are connected by the bar B the ends of which are bent at right angles to the length of the bar and fitted between the bars A to which they are secured in any suitable manner, the upper face of the bar B being preferably substantially flush with the upper edges of the bars A as shown best in Fig. 1. One of the bars A is extended and is secured to the plow point C in any suitable manner, as by bolts $a$ which serve also to secure the end of the brace bar D the other end of which is secured to the lower end of the other bar A in any suitable manner. The plow point C is formed upon two inclines as shown in both views and is braced near the upper edge thereof by a brace E which is secured thereto by bolts $b$.

F is a plate or bar upon the rear face of the upper portion of the plow point upon one side and between this plate or bar and the rear face of this part of the point are secured the lower ends of the spring rods or wires G which may be of any desired size and quality, the said plate or bar being secured by the bolts $c$, and is further secured and strengthened by the vertically-disposed plates or bars $d$, one of which is an extension of the brace E, being offset as seen at $f$ to adapt it to better receive the plate or bar F, the securing bolts being provided with suitable nuts $g$, whereby the parts may be tightened, and by which any one of the spring rods may be removed when necessary. The other ends of the rods G are bent upon themselves as seen at G' and the ends passed loosely through openings in the transverse rod or bar H and after passing through the said bar or rod they are again bent as at $g'$ to prevent their being pulled out of the bar or rod under ordinary circumstances while allowing them to move each independently of the other. This bar or rod H is mounted upon the rods I which pass through the said rod or bar and through the brace B as seen in Fig. 2, receiving upon their ends the nuts $h$ and $i$ as shown. J are coiled springs around the rods I between the brace B and the under side of the bar H. The spring rods G are inclined upward and to the rear and may be adjusted to give the desired pitch thereto, and the tension of the springs J may also be regulated by means of the nuts on the ends of the rods I.

Modifications in detail may be resorted to without departing from the spirit of the invention or sacrificing any of its advantages.

What I claim as new is—

1. A plow provided with a mold-board formed of independently movable spring rods the upper ends of which are curved and bent downward and loosely mounted in a transverse rod, as set forth.

2. A plow provided with a mold-board of spring rods each movable independent of the other, combined with a yieldingly supported transverse bar through holes in which the ends of the said rods loosely work, as set forth.

3. The combination with the plow point, of a plate secured thereto, spring rods held at their lower ends by said plate, a yieldingly-mounted transverse bar through holes in which the upper ends of the rods loosely work, and the bars supporting said bar, as set forth.

4. The combination with the plow point and the handle-bars, of the transverse brace to said bars, the rods adjustably held in said brace, the springs around said rods, the transverse bar on said rods, and the spring rods held at their lower ends to the plow point and their upper ends bent and passed loosely through holes in the transverse bar, substantially as specified.

5. The combination with the plow point and the yieldingly-supported transverse bar, of the spring rods held at their lower ends to the plow point and at their upper ends curved and passed loosely through holes in said bar and bent again after passing through the bar, substantially as and for the purpose specified.

In testimony whereof I affix my signature in presence of two witnesses.

ALEXANDER R. FANCHER.

Witnesses:
L. F. BARBER,
E. A. FANCHER.